July 23, 1963 T. W. HOLDEN 3,098,986

BAND PASS AUDIO FILTER

Filed June 15, 1960 2 Sheets-Sheet 1

INVENTOR.
Thomas W. Holden
BY
Hill, Sherman, Meroni, Gross & Simpson
Attys.

July 23, 1963 T. W. HOLDEN 3,098,986

BAND PASS AUDIO FILTER

Filed June 15, 1960 2 Sheets-Sheet 2

INVENTOR.
Thomas W. Holden
BY
Hill, Sherman, Meroni, Gross & Simpson
Attys

United States Patent Office 3,098,986
Patented July 23, 1963

3,098,986

BAND PASS AUDIO FILTER

Thomas W. Holden, 301 W. 16th Place, Chicago Heights, Ill.

Filed June 15, 1960, Ser. No. 36,195
10 Claims. (Cl. 333—71)

This invention relates to a novel tuning system for radio telegraph receivers and the like and to a novel audio frequency band pass filter particularly adapted for use in such a tuning system.

It is an object of the present invention to provide a novel and improved tuning system for a radio telegraph receiver or the like which provides for binaural sensing of a desired frequency to which the receiver is to be tuned.

It is another object of the present invention to provide a novel adjustable audio frequency band pass filter.

Other objects, features and advantages of the present invention will be apparent from the following detailed description taken in connection with the accompanying drawings, in which.

As shown on the drawings.

Figure 1:
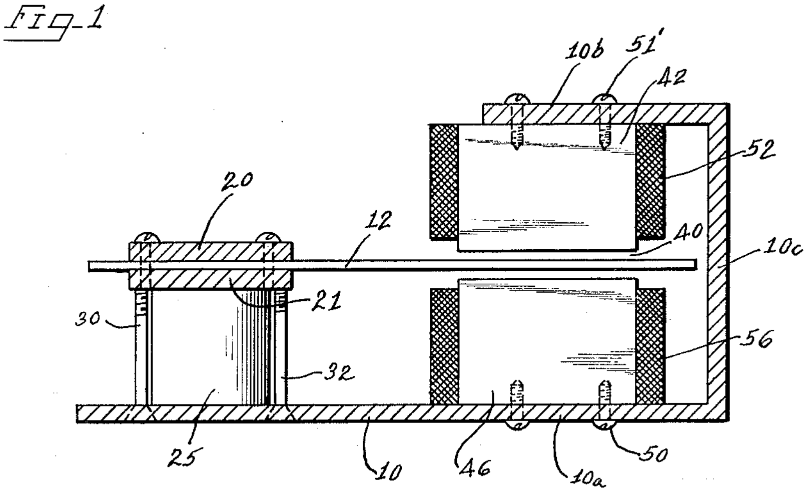
FIGURE 1 is a somewhat diagrammatic vertical sectional view of an audio frequency band pass filter in accordance with the present invention.
Figure 2:
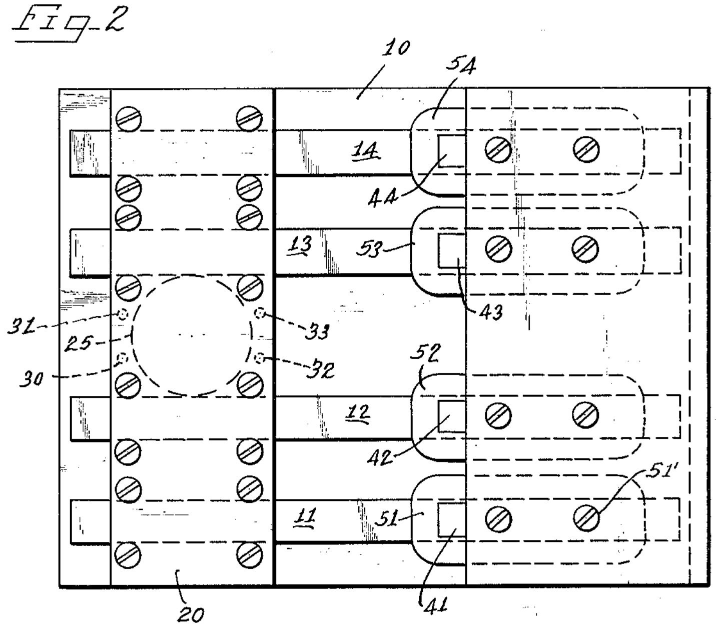
FIGURE 2 is a top plan view of the filter structure of FIGURE 1.
Figure 3:
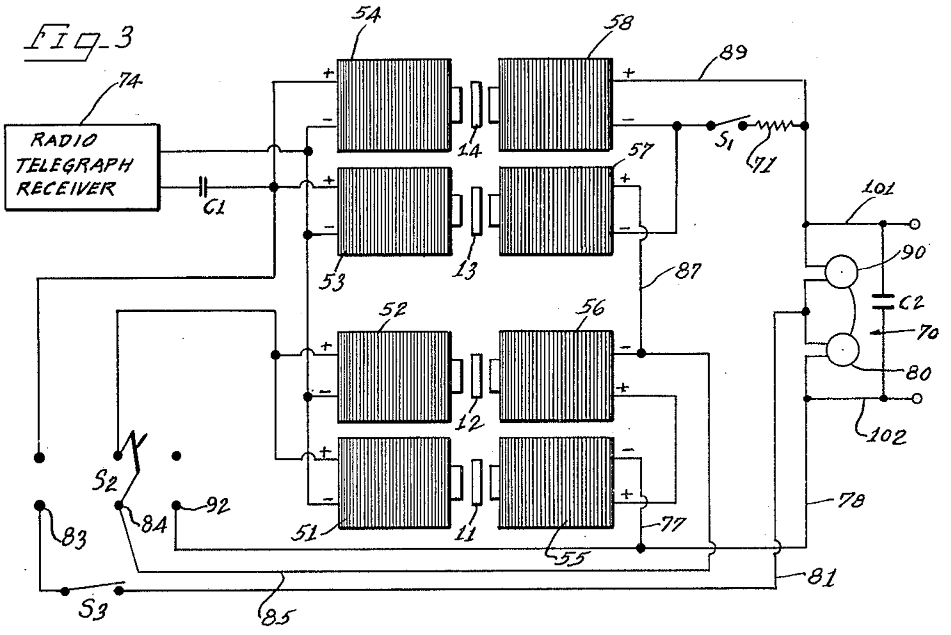
FIGURE 3 is a diagrammatic illustration of a tuning system for use with a radio telegraph receiver or the like constructed in accordance with the present invention.

FIGURES 1 and 2 illustrate a preferred detailed construction of a band pass audio filter for utilization in the tuning system of FIGURE 3. The filter comprises a base 10 of magnetic material such as soft steel. A series of vibrating reeds 11, 12, 13 and 14 having respective different resonant frequencies of vibration such as 775 cycles per second, 850 cycles per second, 925 cycles per second and 1000 cycles per second are suitably clamped between a pair of horizontally extending clamping plates 20 and 21 of magnetic material such as soft steel. A permanent magnet 25 is interposed centrally between the base 10 and the clamping plate 21 and is secured in place by means of vertical screws such as indicated at 30, 31, 32 and 33 of non-magnetic material such as brass. The reeds 11—14 are of a magnetic material such as semi-soft steel.

The free ends of the reeds are each disposed in an air gap such as indicated at 40 in FIGURE 1 between a pair of confronting cores. The upper cores which are visible in FIGURE 2 are identified by reference numerals 41, 42, 43 and 44 and the lower core visible in FIGURE 1 has been identified by the reference numeral 46. It will be understood that substantially identical cores to core 46 are associated with upper cores 41, 43 and 44. The upper cores are shown as having associated therewith helical windings 51, 52, 53 and 54 and each of the lower cores such as 46 has a winding such as indicated at 56 in FIGURE 1. The base 10 includes a lower base portion 10*a* to which the cores such as 46 are secured by means of screws such as indicated at 50 and an upper portion such as indicated at 10*b* carrying the upper cores 41—44 by means of screws such as indicated at 51'. The upper and lower base portions are connected by means of a leg 10*c* so as to provide a convenient and compact assembly.

The upper coils 51—54 may serve as input coils and the lower coils such as 56 may serve as output coils. In this case, the input audio signal is supplied to the upper coils 51—54, for example in parallel. Frequencies near the resonant frequencies of the respective reeds 11—14 cause the reeds to vibrate and thus vary the reluctance of the magnetic circuits associated with the permanent magnet 25, the vibrating reeds and the respective output coils such as indicated at 56. This flux variation in the output coils produced by the vibration of the corresponding reeds produces an output signal from each of the output coils which is a function of the input signal to the input coils 51—54 and the characteristics of the associated reeds 11—14.

FIGURE 3 illustrates diagrammatically the functional arrangement of parts in FIGURES 1 and 2 and shows the complete sequence of lower coils 55—58 associated with the respective reeds 11—14 and the respective lower cores such as indicated at 46 in FIGURE 1. As indicated in FIGURE 3 if a signal voltage of the polarity indicated is applied to each of the input coils 51—54, the instantaneous induced output voltage of output coils 55 and 56 will opposed each other with double pole double throw switch S2 in its left hand position and the output voltages from coils 57 and 58 will also opposed each other. Thus, if the vibrating reeds were held against movement, each individual input frequency would be cancelled at the output. The output coils 55, 56 and 57, 58 are connected so that their output voltages add at a frequency of about 890 cycles per second. It will be understood that while at frequencies away from resonance, the outputs of the respective coils 55—58 tend to cancel and give a resultant zero signal at earphones 70, closure of switch S1 connects resistor 71 across coil 58 and thus alters the normal balance of the output coils and provides a relatively wide range of input frequencies in the earphones 70.

With the single pole double throw switch S2 in its left hand position, and switch S3 closed, the inputs of all of the input coils 51—54 are connected in parallel to the audio output of radio telegraph receiver 74. Capacitor C1 tunes the input circuit to resonate at approximately 1000 cycles per second and capacitor C2 tunes the output circuit to resonate at this same frequency. The output of coils 55 and 56 is connected by lines 77 and 78 to one side of earphone 80 while conductor 81 connects the other side of the earphone 80 through switch S3 and terminals 83 and 84 of switch S2 and line 85 to an output terminal of coil 56 and to an output terminal of coil 57 via line 87. The top terminal of coil 58 is connected by line 89 to a terminal of earphone 90. Thus, the combined output of coils 55 and 56 is connected to earphone 80 and the combined output of coils 57 and 58 is connected to earphone 90 of the earphone head set 70.

When switch S2 is in its right hand position, the inputs of coils 51 and 52 are disconnected from the receiver 74 and contacts 84 and 92 are closed to short circuit the outputs of coils 55 and 56 between lines 77 and 85. Earphones 80 and 90 are then connected in series across the output of coils 57 and 58 by means of line 89 connected to one terminal of the earphones and lines 78, 85 and 87 connected from the other terminal of the earphones to the terminal of coil 57.

In attempting to tune the receiver 74 to a desired frequency such as approximately 900 cycles per second, the switch S2 is placed in its left hand position and switch S3 is closed. As the receiver is tuned through approximately 900 cycles per second, each earphone 80 and 90 will receive a band of frequencies which overlaps in the region between about 850 and 925 cycles per second and the desired frequency of approximately 900 cycles per second will be present in each earphone 80 and 90. The binaural effect produced by the energization of each earphone with the same frequency assists the operator in realizing the desired tuning of the receiver 74. While attempting to tune to the desired frequency, it may prove advantageous to close switch S1 which injects a broader band of input frequencies into the earphone 90. Switch S3 controls the binaural effect by controlling connection of line 81 to the midpoint between the two sets of output coils.

Figure 4:
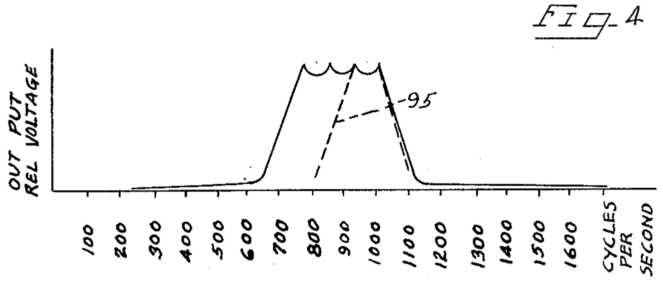
FIGURE 4 illustrates the frequency response characteristics of the filter system of FIGURES 1, 2 and 3.

With switch S2 in its right hand position, the band pass of the filter unit is restricted as indicated by the dash line 95 in FIGURE 4. In this position, switch S1 may be closed to inject a broader range of input frequencies into the earphones 80 and 90 as an aid to tuning. When the desired station is properly tuned by the receiver tuning controls, switch S1 may be opened.

Figure 5:
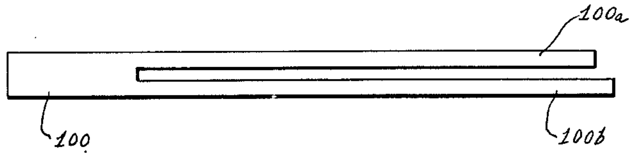
FIGURE 5 illustrates a modified vibrating reed element for a substitution in the filter structures of FIGURES 1, 2 and 3.

FIGURE 5 illustrates a split reed 100 wherein each section or leg **100*a* and 100*b* may be tuned to a different frequency to give a wider band width in the filter structure of FIGURES 1 through 3. By way of example, the reed elements such as 100*a* and 100*b*** associated with each set of input and output coils could be tuned to frequencies differing by 75 cycles per second to cover twice the range approximately as compared with the single frequency reeds of FIGURE 3.

When the receiver apparatus 74 is properly tuned, the desired signal is transmitted via output leads 101 and 102 to any desired utilization circuit.

It will be apparent that many modifications and variations may be effected without departing from the scope of the novel concepts of the present invention.

I claim as my invention:

1. An audio frequency band pass filter comprising a base of magnetic material including spaced generally parallel portions and a connecting portion, a series of mechanical filter assemblies on said base each comprising a pair of magnetic cores connected to spaced opposed portions of the base adjacent the connecting portion and extending toward each other to define an air gap therebetween, vibrating reed means of magnetic material resonant at a respective different frequency of a band of frequencies including a desired intermediate frequency extending along said base and having a free end portion projecting into a corresponding one of said gaps, permanent magnet means connected between the base and the end of each of said reed means opposite the free end portion thereof, and input and output electric coil means linking the respective opposing magnetic cores of each assembly, the input electric coil means being on first magnetic cores extending from one of said spaced generally parallel portions of said base, and the output electric coil means being on second magnetic cores extending from the other of said spaced generally parallel portions of said base toward respective ones of said first magnetic cores, and means interconnecting the output electric coil means in balanced opposed relation with respect to frequencies outside of said band of frequencies to substantially balance out frequencies outside of said band of frequencies at said output electric coil means, said output electric coil means being essentially conductively isolated from said input electric coil means.

2. An audio frequency filter comprising a base having spaced generally parallel portions and a connecting portion of magnetic material, a pair of cores of magnetic material extending from the generally parallel base portions toward each other and defining an air gap therebetween, reed means of magnetic material having a predetermined resonant frequency of vibration disposed with a free end thereof in said gap, a permanent magnet interposed between the base and the end of the reed means opposite said free end thereof, input coil means linking one of said cores, and output coil means linking the other of said cores to provide a frequency selective coupling between the coil means dependent upon the resonant frequency of said reed means, said permanent magnet being disposed on the side of said cores opposite from the side of said cores adjacent said connecting portion and having one polar end adjacent one of said spaced generally parallel portions of said base, said permanent magnet extending in a direction generally normal to said spaced generally parallel portions and having an opposite polar end disposed intermediate the planes of said spaced generally parallel portions of said base, and the reed means having a fixed end adjacent said opposite polar end of said permanent magnet and extending generally parallel to said spaced generally parallel portions of said base intermediate said portions and toward said connecting portion, said output electric coil means being isolated from said input electric coil means to prevent flow of direct current from said input electric coil means to said output electric coil means.

3. An audio frequency filter comprising a base having spaced generally parallel portions and a connecting portion of magnetic material, a pair of cores of magnetic material extending from the generally parallel base portions toward each other and defining an air gap therebetween, reed means of magnetic material having a predetermined resonant frequency of vibration disposed with a free end thereof in said gap, a permanent magnet interposed between the base and the end of the reed means opposite said free end thereof, input coil means linking one of said cores, and output coil means linking the other of said cores to provide a frequency selective coupling between the coil means dependent upon the resonant frequency of said reed means, the reed means being split and the respective legs of the reed means having different characteristic resonant frequencies of vibration to provide a relatively wide band pass characteristic.

4. An audio frequency filter comprising a plurality of reeds of magnetic material resonant at respective audio frequencies which together define a desired band pass width and lying generally in a common plane, output coil means having core means extending toward the free ends of the respective reeds and forming parts of respective magnetic circuits with said reeds, said output coil means all lying on one side of said common plane, and reed driving means coupled to said reeds for driving said reeds in accordance with an input signal to be filtered, said reed driving means being disposed on an opposite side of said common plane opposite said one side, said reed driving means and said output coil means being substantially balanced with respect to frequencies outside of said band pass width to substantially suppress such frequencies, and said output coil means being effectively conductively isolated from said reed driving means to prevent current flow from said reed driving means to said output coil means.

5. An audio frequency filter comprising a plurality of reeds of magnetic material resonant at respective audio frequencies which together define a desired band pass width, output coil means having core means extending toward the free ends of the respective reeds and forming parts of respective magnetic circuits with said reeds, and reed driving means coupled to said reeds for driving said reeds in accordance with an input signal to be filtered, said reed driving means and said output coil means being substantially balanced with respect to frequencies outside of said band pass width to substantially suppress such frequencies, each of said reeds being split to provide two integral sections resonant at different closely adjacent frequencies.

6. An audio frequency filter comprising a base of magnetic material, magnet means secured to said base and having pole means adjacent said base and opposite pole means remote from said base, a plurality of reeds of magnetic material having fixed ends adjacent said opposite pole means of said magnet means and having free ends extending in spaced relation to said base, said reeds being resonant at respective audio frequencies which together define a desired band pass width, output coil means having core means extending from said base toward the free ends of the respective reeds and forming parts of respective magnetic circuits with said reeds and said magnet means, and reed driving means coupled to said reeds for driving said reeds in accordance with an input signal to be filtered, said reed driving means and said output coil means being substantially balanced with respect to frequencies outside of said band pass width to substantially suppress such frequencies, and said output coil means being effectively conductively isolated from said reed driving means to prevent current flow from said reed driving means to said output coil means.

7. An audio frequency filter comprising a base of magnetic material, magnet means secured to said base and having pole means adjacent said base and opposite pole means remote from said base, a plurality of reeds of magnetic material having fixed ends adjacent said opposite pole means of said magnet means and having free ends extending in spaced relation to said base, said reeds being resonant at respective audio frequencies which together define a desired band pass width, output coil means havcore means extending from said base toward the free ends of the respective reeds and forming parts of respective magnetic circuits with said reeds and said magnet means, and reed driving means coupled to said reeds for driving said reeds in accordance with an input signal to be filtered, each of said reeds being split to provide two integral sections resonant at different closely adjacent frequencies, and said reed driving means and said output coil means being substantially balanced with respect to frequencies outside of said band pass width to substantially suppress such frequencies.

8. An audio frequency band pass filter comprising a plurality of reed means having vibrating portions of magnetic material and being resonant at respective audio frequencies which together define a desired band pass width, output coil means having magnetic core means extending toward the vibrating portions of the respective reed means, said reed means having means for producing a unidirectional magnetic flux emanating from the vibrating portions of said reed means and threading said core means of the output coil means, input coil means coupled to said reed means for driving said reed means in accordance with an input signal to be filtered, said input coil means driving said reed means in accordance with desired input signal frequencies of said input signal within said band pass width to produce a modulation of the unidirectional magnetic flux threading said output coil means, said input coil means being responsive to undesired input signal frequencies of said input signal outside said desired band pass width to produce magnetic flux components of corresponding undesired frequencies threading said output coil means and producing spurious voltages therein, output terminals connected with said output coil means for providing an output signal from said filter, at least one of said input and output coil means comprising an even number of coils coupled to respective ones of said reed means, and means connecting said even number of coils in balanced opposing relation with respect to undesired input signal frequencies to balance out any spurious voltages at said output terminals, the number of coils of said one of said input and output coil means being not greater than the number of vibrating portions of said reed means, and the output coil means being conductively isolated from said input coil means to prevent current flow from said input coil means through said output coil means.

9. An audio frequency band pass filter comprising a plurality of reeds resonant at respective audio frequencies which together define a desired band pass width, said reeds having respective free end portions of magnetic material, a plurality of output coils having respective magnetic cores extending toward the respective free ends of said reeds, said reeds having means for producing a unidirectional magnetic flux emanating from the free end portions of said reeds and threading said cores of said output coils, input coil means coupled to said free end portions of said reeds for driving said reeds in accordance with an input signal to be filtered, said input coil means driving said reeds in accordance with desired input signal frequencies of said input signal within said band pass width to produce a modulation of the unidirectional magnetic flux threading said output coils, said input coil means being responsive to undesired input signal frequencies of said input signal outside said desired band pass width to produce magnetic flux components of corresponding undesired frequencies threading said output coils and producing spurious voltages therein, said output coils consisting of an even number of coils each coupled to a respective one of said reeds, and means connecting said output coils in series with an equal number of the coils being connected with respective opposite instantaneous polarities to balance out any spurious voltages induced in said output coils with respect to the series connection thereof, said output coils being conductively isolated from said input coil means to prevent current flow from said input coil means to said output coils.

10. An audio frequency device comprising a base having a generally flat surface, magnetic core means having one end adjacent said surface, said magnetic core means extending from said surface in a direction generally normal to said surface and terminating in an opposite end, a permanent magnet having one polar end adjacent said surface, said magnet extending from said surface in a direction generally normal thereto and having an opposite polar end terminating relatively remote from said surface, reed means of magnetic material having fixed ends generally adjacent and in direct magnetic circuit relation with said opposite polar end of said permanent magnet, said reed means extending generally parallel to said surface and having free end portions disposed in closely spaced relation to said opposite end of said magnetic core means, said permanent magnet establishing unidirectional magnetic flux in a series magnetic circuit including said reed means, said magnetic core means and said base, coil means on said magnetic core means for generating an electric signal in accordance with the vibration of said reed means, and input means for producing a magnetic driving force on said reed means in accordance with an applied electric signal for tending to produce vibration of the free end portion of said reed means in accordance with the applied electric signal.

References Cited in the file of this patent

UNITED STATES PATENTS

| | | |
|---|---|---|
| 1,501,726 | Rice | July 15, 1924 |
| 2,050,165 | Davies | Aug. 4, 1936 |
| 2,141,277 | Nickel | Dec. 27, 1938 |
| 2,160,876 | Lakatos | June 6, 1939 |
| 2,423,225 | Chapin | July 1, 1947 |

FOREIGN PATENTS

| | | |
|---|---|---|
| 356,803 | Great Britain | Sept. 14, 1931 |
| 200,825 | Switzerland | Apr. 17, 1939 |